United States Patent [19]

Licke

[11] 4,052,437
[45] Oct. 4, 1977

[54] PROCESS FOR PRODUCING URETHANE FROM NITRO COMPOUNDS, HYDROXYL COMPOUNDS AND CARBON MONOXIDE USING RHODIUM OXIDE CATALYSTS

[75] Inventor: George C. Licke, Oxford, Mich.

[73] Assignee: Ethyl Corporation, Richmond, Va.

[21] Appl. No.: 615,778

[22] Filed: Sept. 22, 1975

[51] Int. Cl.$^2$ .......................................... C07C 125/06
[52] U.S. Cl. ......................................560/25; 260/351;
560/22; 560/9; 560/13; 560/115; 560/158;
560/114; 560/133; 560/134; 560/24
[58] Field of Search .......... 260/471 C, 482 C, 482 B,
260/468 E, 479 C, 470, 481 C, 351

[56] References Cited

U.S. PATENT DOCUMENTS

| | | | |
|---|---|---|---|
| 3,467,694 | 9/1969 | Hardy et al. | 260/471 C |
| 3,576,836 | 4/1971 | Prichard | 260/453 |
| 3,728,370 | 4/1973 | Ottmann et al. | 260/453 |
| 3,754,014 | 8/1973 | Kober et al. | 260/453 |

FOREIGN PATENT DOCUMENTS

| | | | |
|---|---|---|---|
| 1,025,436 | 4/1966 | United Kingdom | 260/453 AC |

*Primary Examiner*—Jane S. Myers
*Attorney, Agent, or Firm*—Donald L. Johnson; Robert A. Linn; Willard G. Montgomery

[57] ABSTRACT

In the process for preparing a urethane, particularly an aromatic urethane, by the reaction of an organic nitro compound, particularly an aromatic nitro compound, carbon monoxide, and an organic hydroxy compound in the presence of a catalyst, the improvement which comprises employing as said catalyst rhodium oxide, particularly substantially amorphous rhodium oxide, and optionally conducting the reaction in a nitrilic solvent.

20 Claims, No Drawings

PROCESS FOR PRODUCING URETHANE FROM NITRO COMPOUNDS, HYDROXYL COMPOUNDS AND CARBON MONOXIDE USING RHODIUM OXIDE CATALYSTS

BACKGROUND OF THE INVENTION

It is known in the art to manufacture urethanes by reacting hydroxyl group-containing organic compounds, such as alcohols or phenols, with carbon monoxide and certain nitrogenous compounds, using metal carbonyls, certain metal complexes, and certain metallic compounds, as catalysts. Thus, British Pat. No. 1,080,094, to Ibbotson, teaches the above described process using as a catalyst a mixture of two or more metal halides, at least one of the said metal halides being a halide of a transition metal; British Pat. No. 1,092,157, to Gamlen et al, teaches using as a catalyst a metal complex compound containing at least one transition metal and at least one unsaturated hydrocarbon ligand in which the unsaturated system forms a bond with the metal; British Pat. No. 1,087,896, to Ibbotson, teaches using as a catalyst a mixture of one or more metals capable of existence in two or more valency states and one or more halides of metals other than the metal or metals first mentioned and also capable of existence in two or more valency states; U.S. Pat. No. 3,338,956, to Mountfield, teaches using as a catalyst, metal carbonyls. Applicant has discovered that the above reaction can produce very high yields of urethane with relatively little undesirable side products if it is carried out using a rhodium oxide as a catalyst, and optionally, a nitrilic solvent.

SUMMARY OF THE INVENTION

Conversion of organic nitro compounds to urethane is obtained by reacting a nitro compound with carbon monoxide and a hydroxyl containing compound in the presence of an amorphous rhodium oxide catalyst, specifically rhodium dioxide or rhodium sesquioxide, and, optionally, a nitrilic solvent. The urethane thus obtained can be converted, as by thermal decomposition, to an isocyanate.

DESCRIPTION OF THE PREFERRED EMBODIMENTS

The present invention is embodied in a method for producing urethane, particularly an aromatic urethane from an organic nitro, particularly aromatic nitro, compound. In the process of the present invention an organic nitro compound is reacted with carbon monoxide and an organic compound containing at least one hydroxyl group in the presence of a rhodium oxide catalyst, and optionally, a solvent comprised of an organic nitrile compound, to produce a urethane. The urethane can then be transformed, as by thermal decomposition, to an isocyanate.

The organic nitro compounds for use in the process of the present invention can be aliphatic or aromatic nitro compounds. The aliphatic and aromatic nitro compounds can be substituted or unsubstituted. When substituted, they can be substituted with one or more substituents such as nitroalkyl, alkyl, alkenyl, alkoxy, aryloxy, halogen, alkylthio, arylthio, carboxyalkyl, and the like. Preferred nitro compounds contain up to about 20 carbon atoms; more preferred nitro compounds contain up to 16 carbon atoms. More preferred nitro compounds contain up to 10 carbon atoms. Some general examples of suitable aromatic nitro compounds are mononitro compounds such as nitrobenzene, alkyl and alkoxy nitrobenzenes wherein the alkyl group contains up to 10 carbon atoms, aryl and aryloxy nitrobenzenes, wherein the aryl group is phenyl, tolyl, xylyl, naphthyl, chlorophenyl, chlorotolyl, chloroxylyl or chloronaphthyl, chloronitrobenzenes, dinitro compounds such as dinitrobenzene, alkyl and alkoxy dinitrobenzenes wherein the alkyl group contains up to 10 carbon atoms, aryl and aryloxy dinitrobenzenes wherein the aryl group is phenyl, tolyl, xylyl, naphthyl, chlorophenyl, chlorotolyl, chloroxylyl or chloronaphthyl, chlorodinitrobenzenes, trinitro compounds such as trinitrobenzene, alkyl and alkoxytrinitrobenzenes, aryl and aryloxytrinitrobenzenes, wherein the aryl group is phenyl, tolyl, xylyl, naphthyl, chlorophenyl, chlorotolyl, chloroxylyl or chloronaphthyl, and chlorotrinitrobenzenes as well as similarly substituted mono- and polynitro derivatives of the naphthalene, diphenyl, diphenylmethane, anthracene and phenanthrene series. Some specific examples of suitable substituted aromatic nitro compounds are: o-nitrotoluene, m-nitrotoluene, p-nitrotoluene, o-nitro-p-xylene, 2-methyl-1-nitronaphthalene, m-dinitrobenzene, p-dinitrobenzene, 2,4-dinitrotoluene, 2,6-dinitrotoluene, dinitromesitylene, 4,4'-dinitrobiphenyl, 2,4-dinitrobiphenyl, 4,4'-dinitrobibenzyl, bis-(p-nitrophenyl)ether, bis(2,4-dinitrophenyl)ether, bis(p-nitrophenyl)thioether, bis(p-nitrophenyl)sulfone, α,α'-dinitro-p-xylene, 2,4,6-trinitrotoluene, 1,3,5-trinitrobenzene, 1-chloro-2-nitrobenzene, 1-chloro-4-nitrobenzene, 1-chloro-3-nitrobenzene, 2-chloro-6-nitrotoluene, 4chloro-3-nitrotoluene, 1-chloro-2,4-dichloro-2-nitrobenzene, α-chloro-p-nitrotoluene, 1,3,5-trichloro-2-nitrobenzene, 1,3,5-trichloro-2,4-dinitrobenzene, 1,2-dichloro-4-nitrobenzene, α-chloro-m-nitrotoluene, 1,2,4-trichloro-5-nitrobenzene, 1-bromo-4-nitrobenzene, 1-bromo-2-nitrobenzene, 1-bromo-3-nitrobenzene, 1-bromo-2,4-dinitrobenzene, α,α-dibromo-p-nitrotoluene, α-bromo-p-nitrotoluene, 1-fluoro-4-nitrobenzene, 1-fluoro-2,4-dinitrobenzene, 1-fluoro-2-nitrobenzene, o-nitroanisole, p-nitroanisole, p-nitrophenetole, o-nitrophenetole, 2,4-dinitrophenetole, 2,4-dinitroanisole, 1-chloro-2,4-dimethoxy-5-nitrobenzene, 1,4-dimethoxy-2-nitrobenzene, m-nitrobenzaldehyde, p-nitrobenzaldehyde, p-nitrobenzoylchloride, m-nitrobenzoylchloride, 3,5-dinitrobenzoylchloride, ethyl-p-nitrobenzoate, methyl-α-nitrobenzoate, m-nitrobenzenesulfonylchloride, p-nitrobenzenesulfonylchloride, o-nitrobenzenesulfonylchloride, 4-chloro-3-nitrobenzenesulfonylchloride, and 2,4-dinitrobenzenesulfonylchloride. Some typical examples of substituted or unsubstituted aliphatic nitro compounds are nitromethane, nitroethane, nitropropanes, nitrobutanes, nitrohexanes, nitrocyclopentane, nitrocyclohexane, nitrocyclobutane, nitrooctanes, nitrooctadecanes, 3-nitropropene-1, phenylnitromethane, p-bromophenylnitromethane, p-nitrophenylnitromethane, p-methoxyphenylnitromethane, dinitroethane, dinitropropane, dinitrobutane, dinitrohexane, dinitrodecane, dinitrocyclohexane, dinitromethylcyclohexane, and dinitrocyclohexylmethane. For the production of diurethanes the dinitro compounds are preferred. The most preferred dinitro aromatic compounds are the dinitrobenzenes and dinitrotoluenes, particularly 2,4- and 2,6-dinitrotoluene.

The organic compound containing at least one hydroxyl group is preferably an alcohol or a phenol. The alcohol may be a mono- or polyhydric alcohol containing primary, secondary, or tertiary hydroxyl groups.

The phenol can be a monohydric or polyhydric phenol. The alcohols may be either aliphatic or aromatic. Substituent groups may be present with the proviso that the substituent groups do not unduly hinder, impede, or interfere with the reaction of carbon monoxide, nitro compound and alcohol. Some examples of monohydric alcohols are methyl alcohol, ethyl alcohol, n-, and isopropyl benzyl alcohol, chlorobenzyl alcohol, and methoxybenzyl alcohol. Some examples of mono- and polyhydric phenols are phenol, chlorophenol, methyl, ethyl, butyl and higher alkyl phenols, catechol, resorcinol, quinol, 4,4'-dihydroxydiphenylmethane, chloronaphthols, methyl, ethyl, butyl and octyl naphthols, anthranols, chloroanthranols, methyl, ethyl, butyl and anthranols, phenanthrols, chlorophenanthrols and methyl, ethyl, butyl and octyl phenanthrols. Preferred alcohols and phenols are those that contain up to 20 carbon atoms; more preferred more alcohols and phenols containing up to 16 carbon atoms, most preferred alcohols and phenols contain up to 10 carbon atoms. The preferred hydroxyl containing organic compounds are alcohols. The preferred alcohols are the aliphatic alcohols. The preferred aliphatic alcohols are the lower alkanols such as methanol, ethanol, propanol, butanol and the like. The more preferred alkanols are methanol and ethanol. It has been found that generally as the number of carbons bearing abstractable hydrogens in the alcohols or phenols increases, the amount of undesirable side products, particularly amines, increases. Thus, for this reason, it is preferred to use the lower alcohols and phenols.

Although the preferred compounds containing at least one hydroxyl group are the aforedescribed aliphatic and aromatic alcohols and phenols or mixtures of alcohols and/or phenols, diols such as ethylene glycol, diethylene glycol, propylene glycol and dipropylene glycols, triols such as glycerol, trimethylol propane, hexanetriol, and tetrols such as pentaerythritol, ethers may also be used.

The solvents which are optionally employed in the process of this invention are the organic cyano compounds. These compounds may be aliphatic or aromatic cyano compounds. Preferred cyano compounds are those containing up to about 20 carbon atoms. More preferred cyano compounds are those containing up to about 16 carbon atoms. Most preferred cyano compounds are those containing up to 10 carbon atoms. Some examples of the nitrilic solvents are acetonitrile, propionitrile, n-butyronitrile, isobutyronitrile, n-valeronitrile, benzonitrile, toluenitrile, and the like. Some examples of dinitriles are succinonitrile, glutaronitrile, adiponitrile and the like. Mixtures of organic cyanides can be used in the present process. The preferred cyanides are the alkyl cyanides with the more preferred cyanides being the lower alkyl cyanides. The most preferred cyanide is acetonitrile.

The rhodium oxide catalyst employed can be $RhO_2$ or $Rh_2O_3$. The rhodium oxide catalyst should be amorphous rhodium oxide. By amorphous rhodium oxide is meant rhodium oxide which is substantially amorphous, that is, the greater part, by weight, of which is an amorphous state. Small quantities of crystalline rhodium oxide may be present, as long as the proportion of crystalline rhodium oxide to amorphous rhodium oxide is not great enough so as to deleteriously affect the properties of the amorphous rhodium oxide as a catalyst.

Generally, the amorphous rhodium oxide which can be used is commercially available amorphous rhodium oxide, such as that produced by Pfaltz and Bauer, Inc., of Flushing, New York. It is not necessary to vigorously exclude crystalline rhodium oxide from the rhodium oxide insomuch as the amount of crystalline rhodium oxide present in the rhodium oxide is not detrimental to the improved process. Generally, the amount of crystalline rhodium oxide present should be less than 50% by weight, preferably less than 25% by weight, more preferably less than 10% by weight, and most preferably less than 1% by weight. That is to say, more preferably the rhodium oxide should be about 99% amorphous rhodium oxide.

The two oxides of rhodium which are used as catalysts are rhodium dioxide. $RhO_2$, and rhodium sesquioxide, $Rh_2O_3$, both of which are amorphous or substantially amorphous.

The discovery has been made that urethanes can be prepared in high yields by the reaction of an organic nitro compound with carbon monoxide and an alcohol or phenol in the presence of a generally amorphous rhodium oxide catalyst. In a preferred embodiment of the invention the reaction is additionally carried out in a nitrilic solvent. The reaction is conducted under CO pressure. The CO pressures used may be subatmospheric pressures, atmospheric pressures or superatmospheric pressures. Superatmospheric pressures are preferred as at pressures above ambient, the reaction rate is generally increased. There is no real upper limit on the CO pressures that can be used and the upper limit is, therefore, determined by such secondary considerations as cost, equipment design, and the like. While, generally, the pressures can range from atmospheric pressure, provided enough CO can be present at atmospheric pressure to react with the nitro compound, to the aforementioned upper limit, a preferred range of pressures is from about 600 p.s.i. to about 10,000 p.s.i. A more preferred range of pressures is from about 1,000 p.s.i. to about 8,000 p.s.i., while a most preferred range of pressures is from about 1,500 p.s.i. to about 5,000 p.s.i. Generally the amount of CO required is an amount sufficient to coreact with the hydroxyl containing organic compound and nitro compound to form urethane. For complete theoretical conversion of the nitro compound to the urethane at least 3 CO groups are required for every $NO_2$ group in the nitro compound. Therefore, generally 3 or more CO groups for every $NO_2$ group in the nitro compound are preferred. The reaction can proceed with less than 3 moles of CO for every $NO_2$ group per mole of nitro compound, however, the amount of co-products will generally increase with the decrease of CO concentration below the preferred level. Generally the amount of alcohol or phenol required is an amount sufficient to react with the CO and nitro compound to produce urethane. For complete theoretical conversion of the nitro compound to urethane at least one mole of alcohol or phenol is required for every $NO_2$ group present per mole of nitro compound. Thus, in a preferred embodiment of the invention the concentration of alcohol or phenol is such as to provide at least one mole or an excess thereof, of alcohol or phenol for every $NO_2$ group present in the nitro compound. The reaction can proceed with less than a theoretical amount of alcohol or phenol; however, this leads to a mixture of isocyanates, isocyanate-urethanes, and urethanes as the product. The amount of co-products, such as amines, cyclic or heterocyclic nitrogen compounds, may also increase.

The rhodium oxides which are generally amorphous rhodium dioxide and amorphous rhodium sesquioxide, serve as a catalyst and increase the yields of the urethanes. The amount of rhodium oxide used is a catalytic amount. By catalytic amount is meant an amount sufficient to catalyze the conversion of the nitro compound to urethane. Generally, the amount of catalyst should be sufficient to provide about 0.5 gram of rhodium dioxide or sesquioxide per 0.1 mole of nitro compound. At or above these concentrations, using rhodium sesquioxide or dioxide, a nitrilic compound, and a dinitro compound, large yields of diurethanes are obtained. Generally, as the concentration of catalyst decreases, the yields of diurethanes begins to decrease and the yields of monourethanes begins to increase.

The reaction is carried out at temperatures ranging from about ambient to about 400° C. Generally the upper range of the temperature should be below that at which polymerization or decomposition of the reaction components occurs to an undesirable extent. Preferred temperatures are from about 100° to about 225° C. The more preferred temperatures are from about 125° to about 200° C. The reaction times will vary, depending to some extent on the temperatures and pressures at which the reaction is carried out. In general, the higher the temperatures and/or pressures, the faster the reaction, and conversely, the lower the temperatures and/or pressures, the slower the reaction rate. Generally the reaction times range from about thirty minutes to about 12 hours.

The solvent system is one which preferably contains at least a small amount of a nitrilic compound. Thus, the solvent can be composed entirely of a nitrilic compound, a mixture of nitrilic compounds, or a mixture of a nitrilic compound and a non-nitrilic inert organic solvent. Examples of inert organic solvents are the aliphatic or aromatic hydrocarbons such as n-pentane, benzene, toluene, xylene, halogenated aliphatic hydrocarbons such as 1,1,2-trichloro-1, 2,2-trifluoroethane, halogenated aromatic hydrocarbons such as monochlorobenzene, dichlorobenzene, trichlorobenzene, and the like.

The amount of solvent used is a solvating amount, i.e., an amount to sufficiently contact the reactants to enable them to coreact to form the urethane. The organic nitrile compound can be used as a solvent-promoter or as a promoter. It has been found that the nitrile compound, when present in even small amounts, has yield enhancing, conversion enhancing, and rate enhancing effects upon the reaction. By yield enhancing effects is meant that the yield of urethane, particularly the yield of diurethane, is increased over that obtained where there is no nitrile compound present. By conversion enhancing effect is meant that the conversion of the nitro compound is increased over that obtained without the nitrile compound. By rate enhancing effect is meant that the rate of the reaction is increased over that of a system without the nitrile compound. In a more preferred embodiment the solvent system used is one comprised of a nitrile compound or a mixture of nitrile compounds. In this embodiment the nitrile compound acts as both a solvent and a yield, rate, and conversion enhancer or promoter. In another embodiment a yield enhancing amount or promoter amount of the nitrile compound can be added to a solvent system comprised of one of the inert organic solvents described above. In this embodiment as little as 1%, by volume, of nitrile compound can be effective to enhance the rates, yields, and conversions of the reaction. Generally, in this embodiment, the amount of nitrile present, in volume percent of the solvent system, is from about 1% to about 99%, preferably from about 2% to about 50%, and more preferably from about 3% to about 30%. By yield enhancing amount is meant that amount of organic nitrile compound sufficient to increase the yield of the reaction over that of a reaction without an organic nitrile compound. Generally, the proportion of the nitrile compound to the nitro compound is equivalent to a molar ratio of moles of nitrile compound per mole of organic nitro compound in the range between about 0.05:1 to about 25:1.

This invention is illustrated in the following examples:

EXAMPLE 1

A suitable pressure vessel was charged with 160 ml of acetonitrile, 8 grams of methanol, 18.2 grams of 2,4-dinitrotoluene, and 0.75 gram of amorphous rhodium dioxide. The pressure vessel was sealed and purged with nitrogen followed by a carbon monoxide purge. Carbon monoxide was introduced until a pressure of 3,000 p.s.i. was obtained. The pressure vessel was heated to 175° C. The internal pressure was then 4,875 p.s.i. After maintaining the temperature for 12 hours, the pressure vessel was cooled to room temperature. The internal pressure was then 2,600 p.s.i. The pressure vessel was vented and flushed with nitrogen. The reaction mixture was discharged via a dip-leg with nitrogen pressure. The reaction mixture was analyzed by Vapor Phase Chromatography. Analysis by Vapor Phase Chromatography indicated a substantially complete conversion of 2,4-dinitrotoluene and a 99.09% yield of urethane, predominantly dimethyl(4-methyl-1,3-phenylene)-biscarbamate.

EXAMPLE 2

A suitable pressure vessel was charged with 160 ml of acetonitrile, 8 grams of methanol, 18.2 grams of 2,4-dinitrotoluene, and 0.50 gram of amorphous rhodium sesquioxide ($Rh_2O_3$). The pressure vessel was sealed and purged with nitrogen followed by a carbon monoxide purge. Carbon monoxide was introduced until a pressure of 3,000 p.s.i. was obtained. The pressure vessel was heated to 175° C. The internal pressure was then 4,600 p.s.i. After maintaining the temperature for 2 hours, the pressure vessel was cooled to room temperature. The internal pressure was then 2,500 p.s.i. The pressure vessel was vented and flushed with nitrogen. The reaction mixture was discharged via a dip-leg with nitrogen pressure. The reaction mixture was analyzed by Vapor Phase Chromatography. Analysis by Vapor Phase Chromatography indicated substantially complete conversion of 2,4-dinitritoluene, and substantially 100% yield of urethane, predominantly dimethyl(4-methyl-1,3-phenylene)-biscarbamate.

EXAMPLE 3

The general procedure of Example 2 was repeated except that the temperature was maintained at 175° C. for 30 minutes. Analysis of the reaction mixture by Vapor Phase Chromatography indicated a 97.58% conversion of 2,4-dinitrotoluene and an 84.12% yield of urethane, predominantly methyl(4-methyl-3-nitrophenyl)carbamate.

EXAMPLE 4

The general procedure of Example 2 was repeated except that only 0.25 gram of amorphous rhodium sesquioxide catalyst was used. Analysis of the reaction mixture by Vapor Phase Chromatography indicated a 99.5% conversion of 2,4-dinitrotoluene and an 87.39% yield of urethane, predominantly methyl(4-methyl-3-nitrophenyl)carbamate.

EXAMPLE 5

The general procedure of Example 2 was repeated substituting 0.5 gram of crystalline rhodium sesquioxide ($Rh_2O_3$) per 0.5 gram of amorphous rhodium sesquioxide. Analysis of the reaction mixture by Vapor Phase Chromatography indicated essentially no conversion of 2,4-dinitrotoluene to urethane.

EXAMPLE 6

The general procedure of Example 3 was repeated substituting 1 gram of rhodium carbonyl [$Rh_6(CO)_{16}$] for the amorphous rhodium sesquioxide and maintaining the temperature at 175° C. for 5 hours. Analysis of the reaction mixture by Vapor Phase Chromatography indicated a 99.5% conversion of 2,4-dinitrotoluene and a 47.19% yield of urethane, predominantly methyl(2-methyl-5-nitrophenyl)carbamate.

EXAMPLE 7

The general procedure of Example 2 was repeated substituting 1 gram of rhodium bromide ($RhBr_3$) for amorphous rhodium sesquioxide and maintaining the temperature at 175° C. for 5 hours. Analysis of the reaction mixture by Vapor Phase Chromatography indicated a 5.48% conversion of 2,4-dinitrotoluene and a 0.73% yield of urethane, about a 1:1 mixture of methyl-(4-methyl-3-nitrophenyl)carbamate and methyl(2-methyl-5-nitrophenyl)carbamate.

EXAMPLE 8

The general procedure of Example 2 was repeated substituting 160 ml of benzene for the acetonitrile and maintaining the temperature at 175° C. for 5 hours. Analysis of the reaction mixture by Vapor Phase Chromatography indicated a 40.08% conversion of 2,4-dinitrotoluene and a 20.44% yield of urethane, predominantly methyl(4-methyl-3-nitrophenyl)carbamate and methyl(2-methyl-5-nitrophenyl)carbamate.

EXAMPLE 9

The general procedure of Example 2 was repeated substituting 10.1 grams of absolute ethanol for 8 grams of methanol and maintaining the temperature for 2 hours. Analysis of the reaction mixture by Vapor Phase Chromatography indicated a substantially complete conversion of 2,4-dinitrotoluene and a 29.08% yield of dimethyl(4-methyl-1,3-phenylene)biscarbamate, and a 31.30% yield of ethyl(2-methyl-5-nitrophenyl)carbamate.

EXAMPLE 10

A suitable pressure vessel was charged with 160 ml of acetonitrile, 14.8 grams or 0.20 mole of t-butanol, 18.2 grams of 2,4-dinitrotoluene, and 0.75 gram of substantially amorphous rhodium dioxide. The pressure vessel was sealed and purged with nitrogen. This purging with nitrogen was followed by a carbon monoxide purge. After the nitrogen and carbon monoxide purges, carbon monoxide was introduced into said pressure vessel until a pressure of about 2,800 p.s.i. was obtained. The pressure vessel was heated to 150° C. The internal pressure was then 4,110 p.s.i. at 150° C. The temperature of 150° C. was maintained for 5 hours. After maintaining the temperature at 150° C. for 5 hours the pressure vessel was cooled to room temperature. The internal pressure was then about 2,750 p.s.i. The pressure vessel was vented and flushed with nitrogen. The reaction mixture was discharged via a dip-leg with nitrogen pressure. The reaction mixture was analyzed by Vapor Phase Chromatography. Analysis by Vapor Phase Chromatography indicated substantially complete conversion of 2,4-dinitrotoluene to urethane, predominately di-t-butyl(4-methyl-1,3-phenylene)-biscarbamate.

In all of the above examples yield figures based on analysis by Vapor Phase Chromatography are in area percent. In all of the foregoing examples substantially anhydrous conditions were observed.

As can be seen from the foregoing examples conversion of nitro compounds to the urethanes is surprisingly most effective when the reaction is carried out in the presence of an organic nitrile compound using amorphous rhodium oxide catalyst. However, using an amorphous rhodium oxide catalyst and a solvent system other than one containing an organic nitrile compound, such as benzene, effects conversion of the nitro compound to urethane, although the yield per period of time is less than if a nitrilic compound were present. The surprisingly increased yields obtained by carrying out the reaction is a nitrilic solvent are best demonstrated by comparing Example 2 with Example 8. There is an almost five-fold increase in the yield of urethane when the nitrilic solvent is used. Also, as shown by Examples 1 and 2, the yields of diurethanes from dinitro compounds are generally increased when the reaction is conducted in a nitrilic solvent using at least about 0.5 grams of amorphous rhodium oxide catalyst per 0.1 mole of nitro compound and the reaction temperature is from about 125° C. to about 190° C.

Thus, one embodiment of the present invention is in a process for preparing urethanes by reacting an organic nitro compound with carbon monoxide, an alcohol or phenol at an elevated temperature and an elevated pressure in the presence of a catalyst, the improvement which comprises employing as said catalyst substantially amorphous rhodium oxide.

A more preferred embodiment of the present invention is in a process for preparing a urethane by reacting an organic nitro compound with carbon monoxide, an alcohol or phenol at an elevated temperature and an elevated pressure in the presence of a catalyst, the improvement which comprises carrying out the reaction in the presence of an organic nitrile and employing as said catalyst substantially amorphous rhodium oxide.

Another embodiment of the present invention is a process for preparing an aromatic urethane which comprises reacting an aromatic dinitro compound with carbon monoxide and an alcohol at an elevated temperture and an elevated pressure in the presence of an organic nitrile and in the presence of a catalytic amount of substantially amorphous rhodium oxide catalyst.

The process of the present invention is particularly effective in producing aromatic diurethanes from aromatic dinitro compounds. Generally, high yields of these diurethanes can be obtained by the use of substantially amorphous rhodium oxide catalysts. The yields of diurethanes are further enhanced by carrying out the reaction in the presence of the aforementioned organic nitrile compound. This increased yield of diurethanes is demonstrated in Example 1.

Thus, a preferred embodiment of the present invention is in a process for preparing an aromatic diurethane which comprises reacting an aromatic dinitro compound with carbon monoxide and an alkanol at an elevated temperature and pressure in the presence of a catalyst, the improvement which comprises employing as said catalyst substantially amorphous rhodium oxide. Optionally, the reaction can be carried out in the presence of an organo nitrile compound. The amount of said organic nitrile compound being a yield enhancing amount.

In a more preferred embodiment the dinitro compound is dinitrotoluene, the alkanol is methanol or ethanol, the nitrile compound is acetonitrile and is used and functions as both a solvent and yield enhancer or promoter, the elevated temperatures are from about 140° C. to about 190° C., and the elevated pressures are from about 2,000 p.s.i. to about 5,000 p.s.i.

The elevated temperatures and pressures should be such that the organic nitro compound, aliphatic or aromatic alcohols or phenols, and carbon monoxide coreact in the presence of the rhodium oxide catalyst to form urethanes.

By the process of the present invention compounds containing one or more urethane groups can be prepared.

Monourethanes may be prepared from mononitro compounds, monohydroxyl compounds, and carbon monoxide, while polyurethanes can be prepared from polynitro compounds, monofunctional hydroxyl compounds, and carbon monoxide.

While in the preferred embodiment of the present invention a nitro compound is coreacted with carbon monoxide and a hydroxyl containing compound such as an alcohol or phenol in the presence of a rhodium oxide catalyst, other organic compounds containing at least one nitrogen atom bonded directly to a single carbon atoms and to an oxygen or another nitrogen atom may be used in place of the nitro compound to produce urethanes. Examples of these types of compounds which may be substituted for the nitro compound are the organic nitroso, azo and azoxy compounds.

As aforementioned the temperatures and pressures at which the reaction is conducted can generally vary over a wide range and are not too critical. They should be such, however, that the nitro compound, alcohol or phenol, and carbon monoxide coreact in the presence of the catalyst to form the urethane. They should not be such, i.e., high enough, that polymerization or decomposition of the reaction components occurs to an untoward extent.

I claim:

1. In a process for preparing a urethane by reacting an organic nitro compound with carbon monoxide and an alcohol or phenol at an elevated temperature and an elevated pressure in the presence of a catalyst, the improvement which comprises carrying out the reaction in the presence of a promoter amount of an alkyl nitrile and employing as a catalyst substantially amorphous rhodium oxide.

2. A process according to claim 1 wherein said rhodium oxide is rhodium dioxide or substantially amorphous rhodium sesquioxide.

3. A process according to claim 2 wherein said nitro compound is an aromatic nitro compound.

4. A process according to claim 3 wherein said aromatic nitro compound is an aromatic dinitro compound.

5. A process according to claim 4 wherein said aromatic dinitro compound is dinitrotoluene.

6. A process according to claim 2 wherein the alcohol is a lower alkanol.

7. A process according to claim 6 wherein said lower alkanol is methanol.

8. A process according to claim 6 wherein said lower alkanol is ethanol.

9. A process according to claim 2 wherein said alkyl nitrile is a lower aliphatic nitrile compound.

10. A process according to claim 9 wherein said lower aliphatic nitrile compound is acetonitrile.

11. In a process for preparing an aromatic urethane which comprises reacting an aromatic nitro compound with carbon monoxide and an alcohol at an elevated temperature and an elevated pressure, the improvement which comprises carrying out the reaction in the presence of a promoter amount of an alkyl nitrile and of a catalytic amount of substantially amorphous rhodium oxide catalyst.

12. A process according to claim 11 wherein said elevated temperature is from about 125° C. to about 225° C.

13. A process according to claim 11 wherein said rhodium oxide is rhodium sesquioxide.

14. A process according to claim 11 wherein said nitrile is acetonitrile.

15. A process according to claim 14 wherein said aromatic nitro compound is dinitrotoluene.

16. A process according to claim 15 wherein said alcohol is methanol.

17. In a process for preparing an aromatic diurethane which comprises reacting dinitrotoluene with carbon monoxide and methanol at temperatures of from about 125° C. to about 225° C. and at elevated pressures, the improvement which comprises carrying out the reaction in the presence of a promoter amount of acetonitrile and of a catalytic amount of substantially amorphous rhodium oxide catalyst.

18. A process according to claim 6 wherein said alcohol is t-butanol.

19. A process according to claim 15 wherein said alcohol is ethanol.

20. A process according to claim 15 wherein said alcohol is t-butanol.

* * * * *